United States Patent
Kusters et al.

(10) Patent No.: US 9,216,436 B2
(45) Date of Patent: Dec. 22, 2015

(54) PRODUCTION OF ZINC OXIDE COATED POWDERS

(71) Applicants: Stijn Kusters, Sint-Gillis-Waas (BE); Tjakko Zijlema, Rotselaar (BE); Steven Neyens, Olen (BE)

(72) Inventors: Stijn Kusters, Sint-Gillis-Waas (BE); Tjakko Zijlema, Rotselaar (BE); Steven Neyens, Olen (BE)

(73) Assignee: Umicore, Brussels (BE)

( * ) Notice: Subject to any disclaimer, the term of this patent is extended or adjusted under 35 U.S.C. 154(b) by 8 days.

(21) Appl. No.: 14/363,916

(22) PCT Filed: Dec. 14, 2012

(86) PCT No.: PCT/EP2012/075518
§ 371 (c)(1),
(2) Date: Jun. 9, 2014

(87) PCT Pub. No.: WO2013/087830
PCT Pub. Date: Jun. 20, 2013

(65) Prior Publication Data
US 2014/0335270 A1    Nov. 13, 2014

(30) Foreign Application Priority Data
Dec. 16, 2011 (EP) .................................. 11194077

(51) Int. Cl.
*B05D 7/24* (2006.01)
*C09C 1/00* (2006.01)
*C09C 1/02* (2006.01)

(52) U.S. Cl.
CPC ............. *B05D 7/24* (2013.01); *C09C 1/0081* (2013.01); *C09C 1/024* (2013.01); *C01P 2004/50* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| 4,076,682 A * | 2/1978 | Theysohn et al. ............. 523/216 |
| 2002/0168324 A1 * | 11/2002 | Amiche et al. .................. 424/49 |
| 2003/0156964 A1 * | 8/2003 | Kikuchi ......................... 419/34 |
| 2007/0072959 A1 | 3/2007 | Nip |

FOREIGN PATENT DOCUMENTS

| EP | 0 677 326 A1 | 10/1995 |
| EP | 2 223 974 A1 | 9/2010 |
| GB | 988292 | 4/1965 |

OTHER PUBLICATIONS

International Search Report for PCT/EP2012/075518, dated Feb. 12, 2013.

* cited by examiner

*Primary Examiner* — Joesph Miller, Jr.
(74) *Attorney, Agent, or Firm* — Brinks Gilson & Lione

(57) ABSTRACT

This disclosure concerns the production of ZnO (zinc oxide) coated particles for use in rubber as a substitute for bulk ZnO particles. Compared to bulk oxide, oxide coated particles offer the advantage of a higher specific surface per mass unit of ZnO. This implies both ecological and economical benefits. An enhanced process is presented for the synthesis of aggregate particles, comprising a core of $CaCO_3$, which is at least partially coated with ZnO, comprising the steps of: heating a metallic Zn bath, thereby evaporating Zn and forming a Zn-vapor atmosphere; injecting $CaCO_3$ particles as core compound in the Zn-vapor atmosphere; injecting air in the Zn-vapor atmosphere in an amount in excess of the stoichiometric need for the oxidation of the Zn vapor to ZnO. This process is clean and sustainable, producing no unnecessary phases.

4 Claims, 1 Drawing Sheet

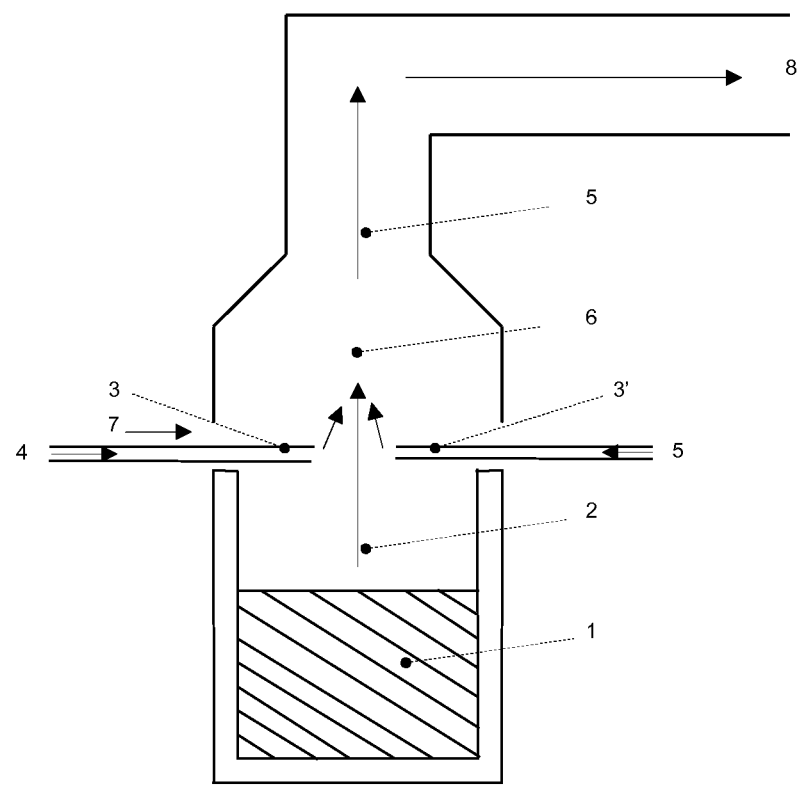

PRODUCTION OF ZINC OXIDE COATED POWDERS

This application is a National Stage application of International Application No. PCT/EP2012/075518, filed Dec. 14, 2012. This application also claims priority under 35 U.S.C. §119 to European Patent Application No. 11194077.1, filed Dec. 16, 2011.

The present disclosure concerns the production of ZnO (zinc oxide) coated particles for use in rubber as a substitute for bulk ZnO particles.

The rubber industry in general, and tire manufacturers in particular, are the largest users of ZnO. It has been used in this capacity for over a century. ZnO along with stearic acid activates sulphur cross linking of rubber. In addition it provides pigmentary properties enhancing the ability to absorb frictional heat, an important property in tire performance. The level of ZnO used is expressed in terms of parts per hundred of rubber, usually amounting to 3 to 5. Essentially all rubber goods contain ZnO.

French process ZnO, made from metallic zinc, is preferred for rubber uses. The major reason for this is that the purity and physical characteristics can be controlled within close limits.

ZnO is labelled as ecotoxic to aquatic life. When used in rubber products, a sizeable fraction of it may enter the biosphere, e.g. when a tire wears out or when it is recycled. Therefore, alternatives to bulk ZnO have been sought after. One proven possibility is using a chemically inert substrate coated with ZnO. This leads to an increased specific activity of ZnO, thus reducing the total amount needed for a determined catalytic effect in rubber.

Such an approach is illustrated in WO 2007/041060. ZnO and/or zinc carbonate coated particles, methods of coating particles with ZnO and/or zinc carbonate, and various applications of such coated particles, including applications in cosmetics, rubber, and other polymer materials, are disclosed. $CaCO_3$ is mentioned as a possible substrate.

The manufacturing process is of hydrometallurgical nature: an aqueous slurry is formed comprising a substrate from silica, clay, talc, mica, or activated carbon, and a zinc ammonia complex. The substrate is coated with ZnO and/or zinc carbonate by driving out the ammonia, such a by heating. This hydrometallurgical process is rather cumbersome, in particular due to the use of ammonia.

Another process, described in JP 60264324, involves the addition of a $ZnCl_2$ solution to an aqueous alkaline mixture of $CaCO_3$ and $Ca(OH)_2$. ZnO appears to form a deposit on the $CaCO_3$. A corresponding amount of $CaCl_2$ is generated, needing to be either further processed or discarded with.

In GB 988292 A, a vapor-deposition process of ZnO on an inert substrate such as silica, barium sulphate, titanium dioxide and mica is disclosed. These core materials are said to be inert and no measures are taken nor discussed to prevent thermal degradation. The process would therefore not be suitable for deposition on $CaCO_3$.

Accordingly, an improved process is needed to avoid the use of dangerous chemicals or the generation of large amounts of preventable reaction products. The process should thus be ecologic and economic so as ensure its sustainability.

To this end, a process is presented to synthesize aggregate particles comprising a core of $CaCO_3$, which is at least partially coated with ZnO, comprising the steps of: heating a metallic Zn bath, thereby evaporating Zn and forming a Zn-vapor atmosphere; injecting $CaCO_3$ powder in the Zn-vapor atmosphere; injecting air in the Zn-vapor atmosphere in an amount in excess of the stoechiometric need for the oxidation of the Zn vapor to ZnO.

In particular when the core compound is thermally unstable, such as with $CaCO_3$ core, it is useful to rapidly quench the coated particles. It is then recommended to inject an amount of air of at least 700% of the stoechiometric needs for the oxidation of the Zn vapor to ZnO. Lower amounts of air lead to higher process temperatures. Above 800° C., $CaCO_3$ decomposes at least partially to CaO and $CO_2$. CaO is detrimental as it tends to react with atmospheric moisture, thereby forming large agglomerates essentially disqualifying the product. It is therefore recommended to limit CaO to less than 10 wt. %; a maximum concentration of 5 wt. % is even preferred.

The core compound and the air can be premixed and injected together through one ore more injection nozzles.

The weight ratio of the core compound to ZnO in the aggregate particles is preferably adjusted between 0.3 and 3, more preferably between 0.5 and 2. This ensures an adequate activity of the aggregate particles in rubber.

The core particles should preferably have a median particle diameter ($D_{50}$) of less than 5 μm to preserve the mechanical integrity of the rubber. Moreover, their BET should advantageously be higher than 2 $m^2/g$ so as to provide adequate surface for ZnO deposits.

Another embodiment concerns the use of the aggregate particles as vulcanization agent in rubber.

A further embodiment concerns an apparatus to synthesize aggregate particles comprising: a heated melting and evaporation chamber for the production of Zn vapor; one or more nozzles for injecting a particulate compound in the Zn vapor; means for injecting air in the Zn vapor; and means for separating and collecting the solids from the gases.

The means for injecting air in the Zn vapor can be combined with the one or more nozzles for the injection of the core particles.

Further means to admix additional quantities of air can be provided, so as to ensure quenching of the products to near-ambient temperatures. Such so-called bypass air can also contribute to suspend the particles in the gas phase, carrying them to a filtration and gas extraction unit, where the particles are collected.

Apart from the above-mentioned advantage of the present pyrometallugical process over its hydrometallurgical counterpart, it should be mentioned that the process also achieves a significant purification of the zinc by virtue of the evaporation. This is important in view of the envisaged application in rubber, which necessitates essentially pure zinc oxide (Zn>99 wt. %, preferably Zn>99.5 wt. %).

FIG. 1 illustrates the apparatus used for realizing the process. Shown are the heated melting and evaporation chamber (1), including the molten Zn bath; the production of Zn vapor (2); the nozzles (3) for injection of air (4) and (3') for core compound particles (5); the reaction zone (6), also including the quenching zone; the optional provision for entry of bypass air (7) to entrain the aggregate particles with the gas stream (8) to solid/gas separation equipment.

In the reaction and quenching zone, the Zn vapor burns with the oxygen of the air, forming ZnO, which, having a very low partial pressure, will tend to form deposits on any substrate within reach. The core compound particles will thus serve as seeds, getting covered with patches of ZnO all over their surface.

Quenching of the reaction products may be important as many core compounds of interest, such as $CaCO_3$, cannot withstand temperature much above 800° C. for any significant amount of time.

The process is illustrated below, according to an embodiment using $CaCO_3$ as the core compound. $CaCO_3$ is indeed recognized by tire manufacturers to be well compatible with the rubber.

The apparatus is schematically represented in FIG. 1. The melting and evaporation chamber or furnace is externally heated with gas burners. The furnace has a diameter of 0.5 m. The contained metallic zinc is molten and then further heated to its boiling point of 907° C. The heating is regulated so as to evaporate the zinc at a rate of about 24.1 kg/h. A precise regulation is possible if the furnace is e.g. mounted on load cells.

Use is made of 2 different qualities of $CaCO_3$ core powders, namely Superfine S® and Omyabrite®, both available from Omya. These are chosen in view of their relatively fine median particle size ($D_{50}$) of respectively 1.9 and 2.8 μm and of the high BET of respectively 2.6 and 27 $m^2/g$.

The dosing of the $CaCO_3$ powder relies on a commercial 4-cell feeder provided by IMPAKT™. A minor part of the total amount of air is delivered by the feeder system itself, the rest is added from an independent pressurized source.

The injection rate amounts to 30 kg/h of $CaCO_3$, together with 350 $Nm^3/h$ of air. Both the core compound and the air are injected in the reaction zone together, through a single common nozzle. This amount is much higher than the amount of about 21 $Nm^3/h$ that is needed for the stoechiometric burning of the evaporated Zn. The excess air has the function to quench the reaction products, a preferred feature if the core compound is thermally unstable. Such is the case with $CaCO_3$, which is known to decompose rapidly above 800° C. Analysis with X-ray diffraction shows that the obtained powders contain less than 5 wt. % of CaO.

The synthesised powders contain essentially all the Zn, fully converted to the oxide, coating the core compound with a non-uniform layer. A small fraction of the ZnO may also be present as individual particles.

These powders are tested as to their activity in the vulcanisation of rubbers of the type used in automotive tires. The new powders are compared to benchmark bulk ZnO powder used for this purpose, which is known as "red seal" ZnO.

It appears that the specific (by weight) activity of the synthesised powders is 2 to 4 times the activity of "red seal" bulk ZnO. It is assumed that the ZnO prepared according to the present process has a significantly higher specific accessibility than bulk ZnO, because it resides essentially at the surface of the $CaCO_3$.

The BET of the obtained powders amount to 8.09 $m^2/g$ using Superfine S®, and to 10.9 $m^2/g$ using Omyabrite®. These values compare favourably to "red seal" ZnO, having a typical BET of 4 to 7 $m^2/g$ only.

The particle size distributions are characterized by a median ($D_{50}$) of 1.4 μm and of 1.9 μm when starting from Superfine S® and Omyabrite® respectively. These values of BET and of particle diameter are considered most satisfactory for the envisaged application.

The invention claimed is:

1. A process for the synthesis of aggregate particles, each particle comprising a core of $CaCO_3$, which is at least partially coated with ZnO, comprising:
   heating a metallic Zn bath, thereby evaporating Zn and forming a Zn-vapor atmosphere;
   injecting air into the Zn-vapor atmosphere in order to oxidize Zn vapor to ZnO, wherein the amount of air being injected is at least 700% of the stoichiometric needs for the oxidation of the Zn vapor to ZnO; and
   injecting $CaCO_3$ particles as core compound in the Zn-vapor atmosphere.

2. The process according to claim 1, wherein the injection of the core compound and the injection of air are performed together through the same injection nozzle.

3. The process according to claim 1, wherein the weight ratio of the total of core compound to ZnO in the aggregate particles is between 0.3 and 3.

4. The process according to claim 1, wherein the core compound particles have a median diameter of less than 5 μm and a BET of more than 2 $m^2/g$.

* * * * *